United States Patent Office 2,845,439
Patented July 29, 1958

2,845,439

PREPARATION OF URONIC ACIDS AND DERIVATIVES THEREOF

Robert A. Reiners, Chicago, Ill., assignor to Corn Products Refining Company, New York, N. Y., a corporation of New Jersey No Drawing. Application August 19, 1949, Serial No. 111,340

22 Claims. (Cl. 260—340.9)

The present invention relates to the production of uronic acid derivatives and uronic acids, and particularly to the production of glucuronic acid, its salts, or its lactone.

Production of a uronic acid from an aldose requires oxidizing the primary alcohol group of the sugar without attacking the aldehyde function. Since the aldehyde function is the group most susceptible to oxidative attack, oxidation of the unmodified sugar never produces any substantial amount of uronic acid.

Oxidation of the primary alcohol group of an aldose molecule in the form of a derivative in which the aldehyde function is suitably protected offers a means of preparing uronic acid derivatives in a form applicable for subsequent processing to obtain the uronic acid or its lactone. However, no oxidant is known which attacks the primary alcohol group of such aldose derivatives specifically. Some of the secondary alcohol groups are oxidized simultaneously and this results in lowered yields of the uronic acid derivative and a mixture of reaction products from which the desired uronic acid derivative is difficult to separate. These difficulties have necessitated complicated and commercially impractical processes for obtaining uronic acids from carbohydrate materials. For example, glucuronic acid has been prepared by a process in which 1,2-isopropylidene glucose was first prepared from glucose and then converted to 1,2-isopropylidene-3,5-benzal glucose. The latter compound was then oxidized with potassium permanganate to form 1,2-isopropylidene-3,5-benzal glucuronic acid (Ber. 66, 1326 (1931)). Beta - D - glucose - 1,2,3,4 - tetraacetate has been oxidized in a similar manner and the product hydrolyzed to obtain glucuronic acid (J. Chem. Soc. 1939, 1530). The yield of glucuronic acid obtained by both these methods was low and the processes are too complicated to be practical for commercial production.

Glucuronic acid has been obtained by hydrolyzing such compounds as bornyl glucuronoside. Such glucuronic acid derivatives can be extracted from the urine of animals which have been fed suitable drugs. This method is tedious, expensive, and obviously entirely unsuitable for large scale production of glucuronic acid.

Commercially feasible methods of preparing glucuronic acid or its lactone or salts or derivatives are desirable since several of these compounds have been found to have therapeutic value. For example, it has been reported (Journal Lancet, 67, 451 (1947)) that glucuronic acid or its salts are of benefit in the treatment of arthritis. Combinations of streptomycin and glucuronolactone have been found useful in sterilizing the gut prior to surgery. (Bulletin U. S. Medical Department 9, 265 (1949); also paper presented by Pulaski, Connell and Seely at the 98th Annual Session A. M. A. June 8, 1949.)

Nitrogen dioxide is known to oxidize the primary alcohol group somewhat preferentially in sugar derivatives in which the aldehyde function is adequately protected. When methyl glucoside is oxidized with nitrogen dioxide the yield of uronic acid derivative may be as high as 40 percent of the theoretical, but the highly acidic system results in some hydrolysis of the group protecting the aldehyde function, leading to the formation of acids not sought or desired. Furthermore, nitrogen dioxide is such a strong oxidizing agent that considerable indiscriminate oxidation occurs along the carbon chain. This results in formation of keto acids and rupture of the carbon chain in such acids to form acids having fewer carbons than the original sugar and in degradation products which impart color to the reaction mixture. Isomerization of some of the parent carbohydrate derivative may also take place in the strongly acid medium. These undesired reactions all tend to lower the yield of uronic acid and to result in a complicated mixture of reaction products from which the uronic acid derivative is difficult to isolate. In addition, oxidation of carbohydrate materials with nitrogen dioxide involves a highly corrosive system and a strongly exothermic reaction that may go out of control and result in explosions unless reaction conditions are held within rigid limits. Considerable hazard is involved in such operation. Despite their limitations development utilizing such chemical oxidants as nitrogen dioxide represent the most significant approaches to the production of uronic acid prior to the present invention.

Accordingly it is an object of this invention to provide an improved method for the production of uronic acids. It is a further object to provide an improved method for the production of uronic acid derivatives. It is still a further object to provide a method of selectively oxidizing the primary alcohol group of aldose sugars. Another object is the provision of a simple method for preparing uronic acids and derivatives thereof in high yields whereby the use of corrosive systems and hazards of certain oxidizing agents are eliminated. Other objects will appear hereinafter.

I have found that when aldose derivatives with the aldehyde function suitably protected are subjected to oxidation with oxygen or oxygen-containing gas in the presence of a proper catalyst, the primary alcohol group of said aldose derivatives is oxidized in a highly selective manner to produce high yields of the corresponding uronic acid derivative from which the uronic acid can be obtained with greater ease and in higher yield than has been possible heretofore.

In general the present invention comprises oxidizing an aqueous solution of an aldose derivative in which the aldehyde function is suitably protected, in the presence of certain specific catalysts, with an oxygen-containing gas, at a temperature ranging from room temperature to the decomposition temperature of the aldose derivative or its uronic acid oxidation product, the system preferably being maintained under controlled conditions of pH.

In carrying out the present invention the aldose derivative, such as a glucoside, is first dissolved in water, preferably containing an amount of alkaline buffer material such that the solution will not become strongly acidic during the reaction. The resultant solution is contacted with the catalyst at suitable temperature and in the presence of air or oxygen. After oxidation has occurred a number of procedures may be used to refine the oxidation mixture and to recover the uronic acid therefrom. Colored substances may be removed, for example, by carbon treatment or by extraction with solvents such as butanol, a commercial mixture of amyl alcohols sold under the trademark Pentasol, or cyclohexanol. Acidic components of the mixture may be separated from non-acidic components by suitable treatment with ion exchange resins. Dicarboxylic acids which may be formed by side reactions may be precipitated and removed, for example, as their calcium or barium salts. The uronic acid derivative may be hydrolyzed by any suitable means such as, for example, by heating in solution with sulfuric acid, phosphoric acid, hydrochloric acid, ethane sulfonic acid or any of a number of cation exchange resins. The hydrolysis may be carried out at atmospheric or higher pressures. The uronic acid or its lactone may be recovered from the liquor by concentrating to such an extent that crystallization occurs, with or without removing the hydrolyzing catalyst. Crystallization may be effected from water; or various solvents such as, for example, acetic acid, isopropyl alcohol, butanol, tertiary butyl alcohol, acetone, dioxane, or diacetone alcohol, may be added to facilitate crystallization. A suitable method of recovering the uronic acid is as follows:

The liquor containing the oxidized aldose derivative, i. e. the glucuronoside, in the case where a glucoside is used, is separated from the catalyst and then contacted with a cation exchanger to remove metallic ions and then with an acid adsorbent resin to separate the acidic materials from the neutral materials. The uronoside which is adsorbed on the acid adsorbent resin is eluted with an alkaline material such as a solution of sodium hydroxide. The eluate is contacted with a cation exchanger to remove cations. The demineralized solution containing the uronoside is then hydrolyzed with an acid such as sulfuric. The hydrolysate is concentrated at low temperature, with or without removal of the hydrolyzing agent, and the uronic acid or its lactone is allowed to crystallize.

In carrying out the present invention there may be used any water soluble aldose derivative in which the aldehyde function is suitably protected. The term aldose derivative as used therein is intended to refer to a compound in which the aldehyde function is protected by an acetal linkage and in which the primary alcohol group is free, and wherein the skeleton of the aldose (i. e., the carbon chain) remains intact and from which the original aldose may be regenerated by hydrolysis. Examples of such derivatives suitable for this invention include both the alpha- and beta- forms of glucosides such as propyl glucoside, isopropyl glucoside, butyl glucoside, methyl glucoside, ethyl glucoside, phenyl glucoside, benzyl glucoside, cyclohexyl glucoside, and beta-hydroxyethyl glucoside; 1,2-isopropylidene glucose, sucrose, maltose and trehalose may also be used. Other glycosides such as methyl-, ethyl-, or propyl-galactosides, and the corresponding mannosides, xylosides, and arabinosides are also suitable. Mixtures of glycosides may also be used.

Contact of the material undergoing oxidation with the catalyst and oxidizing agent may be effected in conventional manner. For example, the catalyst may be placed in a column and the solution of the aldose derivative passed through the column concurrent or countercurrent to the oxygen containing gas stream. A recycling process may also be used wherein any starting material that escapes oxidation during the first pass is utilized.

The oxidation may be effected batchwise, in which case the catalyst is placed in the solution which is to be oxidized, and kept in suspension by suitable agitation while the oxygen containing gas is bubbled through the mixture.

Since acids are produced during the oxidation and since the reaction is slower at low pH, the uronic acid derivative is produced at a higher rate if sufficient alkaline buffer material is present in the solution undergoing oxidation or is added to the solution during oxidation to maintain the pH within the preferred range of 4 to 11 throughout the reaction. Any salt which has a buffering effect and has no deleterious effect on the catalyst may be used to maintain the pH within the desired range. Sodium or potassium carbonate, sodium bicarbonate, disodium phosphate, sodium tetraborate, and sodium hydroxide are suitable. Sodium carbonate is a preferred buffer.

The temperature of the material undergoing oxidation may vary from room temperature to a temperature not exceeding the decomposition temperature of the aldose derivative used or the uronic acid derivative produced, 40 to 120° C. being the preferred range. The oxidation may be carried out under pressure.

The time depends upon the activity of the catalyst, the amount thereof, the temperature, the pH and the concentration of oxygen. The reaction proceeds faster at higher than room temperatures and in neutral or somewhat alkaline media.

Among the catalysts which are satisfactory for purposes of the present invention are platinum, palladium, and mixtures thereof. These catalysts may be supported on suitable materials such as alumina, carbon or silica gel.

The following examples which are intended as informative and typical only and not in a limiting sense will further illustrate the invention.

*Example 1.—Oxidation of methyl-alpha-D-glucoside*

An aqueous solution was prepared containing 5.82 percent methyl alpha-D-glucoside (99 percent alpha isomer) and 3.0 percent of sodium bicarbonate (C. P. grade). This solution was allowed to drip slowly (12–20 ml. per hour) through a column containing 158 g. of platinum-on-alumina catalyst. (The catalyst used was a commercial brand marketed by Baker and Company and contained 0.5 percent of platinum.) The contact time was about 2.5 to 3 hours. The contents of the column were maintained at a temperature of 70° C. by circulating water at this temperature through a jacket surrounding the column. An excess of oxygen was passed through the column countercurrent to the liquid flow.

A portion of the effluent from the column, containing methyl glucuronoside equivalent to 24 grams of glucuronic acid, was passed through a column containing a commercial cation exchanger to remove metallic ions and then through a column containing a commercial anion exchanger to separate the acidic from the neutral components of the solution. The anion exchanger on which the methyl glucuronoside had been adsorbed was eluted with a 4 percent solution of sodium hydroxide. The eluate was then passed through a column containing a cation exchanger to remove metallic ions.

The demineralized solution was concentrated under vacuum until the solids content of the solution was 10 to 15 percent. Sufficient sulfuric acid was added to the concentrated solution to result in a normality of 0.7. Thereafter the solution was refluxed for 8 hours to hydrolyze the methyl glucuronoside to glucuronic acid. The hydrolyzate was extracted twice with one-fourth volume of butanol.

The pH of the extracted hydrolyzate was adjusted to about 2.0 with a slurry of barium hydroxide and the resulting precipitate of barium sulfate was removed by filtration. The filtrate was concentrated under high vacuum to about 50 ml. 100 ml. of glacial acetic acid was added and the resulting solution was concentrated under moderate vacuum (overhead temperature of 60–65° C.) to a volume of 75 ml. On cooling, 10 g. of crystalline glucuronolactone was obtained. This was separated by filtration.

*Example 2.—Oxidation of 1,2-isopropylidene glucose*

A solution was prepared by dissolving 20.6 g. of 1,2-isopropylidene glucose and 9.4 g. of sodium bicarbonate (C. P. grade) in 625 ml. of water. To the solution was added 75 g. of powdered platinum-on-alumina catalyst containing 0.5% of platinum (commercially available from Baker and Company) and the resulting suspension was thereafter heated to 60° C. The suspension was maintained at this temperature for 10 hours during which time oxygen was bubbled through it. The catalyst was removed by filtration and the filtrate contained isopropylidene glucuronic acid in an amount equivalent to 74.5 percent of the theoretical yield as determined by the naphthoresorcinol method.

Example 3.—Oxidation of 1,2-isopropylidene glucose 1,2-isopropylidene glycose (61.6 g.) was dissolved in one liter of water containing 30 g. of sodium bicarbonate, and 240 g. of powdered platinum-on-alumina catalyst (commercially available from Baker and Company and containing 0.5% platinum) was added. The resulting suspension was heated to 60° C. and maintained at that temperature with constant stirring for 18 hours while oxygen was bubbled through continuously. Conversion of the isopropylidene glucose to isopropylidene glucuronic acid amounted to 66.4 percent of theory.

The catalyst was removed by filtration and the solution was passed through a column containing a commercial cation exchanger to remove metallic ions, then through a column containing a commercial anion exchanger to separate acidic materials from neutral materials. The anion exchanger was eluted with 4 percent sodium hydroxide solution to recover the uronic acid derivative. The eluate was demineralized by passage over a cation exchange resin and then concentrated to 12 percent solids. The concentrated solution was brought to 0.1 normal with respect to sulfuric acid and refluxed for 3 hours to hydrolyze the isopropylidene glycuronic acid. The hydrolyzate was extracted with butanol and the aqueous layer was concentrated under vacuum and allowed to crystallize. The glucuronolactone that crystallized from the concentrated amounted to 19.9 grams or 37.2 percent of the theoretical yield based on 1,2-isopropylidene glucose.

Example 4.—Oxidation of sucrose

A solution was prepared containing 97.5 g. of sucrose and 56.3 g. of sodium bicarbonate in 1875 ml. of water. To this solution was added 225 g. of powdered platinum-on-alumina catalyst (commercially available from Baker and Company and containing 0.5% platinum). The resulting mixture was heated to 60° C. and agitated continuously while oxygen was bubbled through the suspension. At the end of 6 hours the solution contained 60 percent of the theoretical yield of the glucuronic acid derivative, as determined by the naphthoresorcinol test.

Example 5.—Oxidation of methyl-alpha-D-glucoside

An aqueous 5.8 percent solution of methyl-alpha-D-glucoside was prepared containing sufficient sodium carbonate to buffer the system at pH 11. A commercial powdered palladium-on-alumina catalyst (commercially available from Baker and Company and containing 5% palladium) was added in an amount to provide 2.0 percent palladium based on methyl glucoside. The resulting suspension was heated to 60° C. and oxygen was bubbled through at the rate of 445 cc. per minute. At the end of 8 hours 40 percent of the methyl glucoside had been converted to methyl glucuronoside, as determined by the naphthoresorcinol test.

Example 6.—Oxidation of methyl-alpha-D-glucoside

In a run identical with that described in Example 5 except that a commercial palladium-on-activated charcoal catalyst (also available from Baker and Company and containing 5% palladium) was used, methyl glucoside was converted in 6 hours to methyl glucuronoside in a yield amounting to 45 percent of theory, as determined by the naphthoresorcinol test. The catalyst was charged at the same palladium to glucoside ratio used in the run described in Example 5.

Example 7.—Oxidation of methyl-alpha-D-glucoside

A solution was prepared containing 5.82 percent methyl alpha-D-glucoside and 1.89 percent sodium carbonate. This solution was passed through a column containing 158 g. of pelleted platinum-on-alumina catalyst (commercially available from Baker and Company and containing 0.5% platinum) at a flow rate such that 0.862 g. of methyl glucoside was fed to the column per hour. Oxygen was passed continuously and countercurrent to the liquid flow at the rate of 24 liters per hour. The contents of the column were maintained at a temperature of 70° C. Operating in this manner 30.5 percent of the methyl glucoside in the feed solution was converted to methyl glucuronoside in a single pass over the column.

The effluent from the oxidation column was passed over a cation exchanger to remove metallic ions and then over an anion exchanger to adsorb acidic substances. The dry substance in the effluent from the anion exchanger, mainly methyl glucoside, amounted to 44.7 percent of the methyl glucoside that had been fed to the column. This effluent was concentrated to 5.7 percent solids, buffered with sodium carbonate and again passed through the oxidation column under the same conditions employed with the original methyl glucoside solution. The product from this recycling process was worked up separately in the same manner described in Example 1 except the sulfuric acid used for hydrolysis was not removed. The yield of crystalline glucuronolactone amounted to 12.5 percent of theory, considering all of the organic dry substance in the recycled liquor as methyl glucoside.

Example 8.—Oxidation of methyl-alpha-D-glucoside

An aqueous solution was prepared containing 2.9 percent methyl-alpha-D-glucoside and 0.92 percent sodium carbonate. To this solution was added 12 percent of a finely divided palladium-on-alumina catalyst (commercially available from Baker and Company and containing 0.5 percent palladium). The resulting mixture was stirred and maintained at a temperature of 70° C. while oxygen was bubbled through the system. At the end of 9 hours 58 percent of the methyl glucoside had been converted to methyl glucuronoside, as determined by the naphthoresorcinol test.

Example 9.—Oxidation of methyl-alpha-D-glucoside

An aqueous solution was prepared containing 5.82 percent methyl alpha-D-glucoside and 1.3 times the amount of sodium bicarbonate that would be required to neutralize the solution if all of the methyl glucoside was converted to methyl glucuronoside. This solution was passed at various liquid flow rates over a column containing 158 g. of pelleted platinum-on-alumina catalyst (commercially available from Baker and Company and containing 0.5% platinum) while oxygen was passed countercurrent to the liquid flow. The contents of the column were maintained at a temperature of 70° C.

At methyl glucoside feed rates of 1.06, 1.36 and 1.77 grams per hour the rates of production of methyl glucuronoside were 0.262, 0.291 and 0.386 gram per hour, respectively.

Example 10.—Oxidation of methyl glucoside

An aqueous solution containing 5.82 percent crude mixed methyl glucosides was prepared from the total reaction mixture obtained in the preparation of methyl glucoside. To this solution was added 1.3 times the amount of sodium bicarbonate that would be required to neutralize the solution if all of the methyl glucoside were converted to methyl glucuronoside. The resulting solution was subjected to oxidation over a column of pelleted platinum-on-alumina catalyst under the same conditions described in Example 9. At a feet rate equivalent to 0.826 gram of methyl glucoside per hour the rate of production of methyl glucuronoside (as glucuronic acid) was 0.220 gram per hour.

A batch of liquor obtained by oxidizing the crude mixture of methyl glucosides as described above was processed as described in Example 1 except the sulfuric acid used for the hydrolysis was not removed to recover glucuronolactone. The amount of crystalline glucuronolactone recovered amounted to 60 percent, based on the amount of methyl glucuronoside present in the effluent from the oxidation column.

Example 11.—Oxidation of ethyl glucoside

An aqueous solution was prepared containing 0.3 mole of crude ethyl glucoside and 0.39 mole of sodium bicarbonate per 100 ml. To this solution was added 2.42 g. of powdered platinum-on-alumina catalyst (0.5% platinum, commercially available from Baker and Company) per 100 ml. of solution. Oxygen was bubbled through the resulting suspension which was maintained at a temperature of 60° C. At the end of 6 hours 68 percent of the ethyl glucoside had been converted to ethyl glucuronoside, as determined by the naphthoresorcinol test.

Example 12.—Oxidation of beta-hydroxyethyl glucoside

An oxidation was carried out exactly as described in Example 11 except that the solution that was oxidized contained 0.3 mole of beta-hydroxyethyl glucoside instead of ethyl glucoside. At the end of 6 hours 18 percent of the beta-hydroxy-ethyl glucoside had been converted to a uronic acid derivative.

Example 13.—Oxidation of methyl mannoside

An oxidation was carried out exactly as described in Example 11 except that the solution that was oxidized contained 0.3 mole of methyl manoside instead of ethyl glucoside. At the end of 6 hours 61 percent of the methyl mannoside had been converted to methyl mannuronoside.

Example 14.—Oxidation of methyl galactoside

An oxidation was carried out exactly as described in Example 11 except that the solution that was oxidized contained 0.3 mole of methyl galactoside instead of ethyl glucoside. At the end of 6 hours 81 percent of the methyl galactoside had been converted to methyl galacturonoside.

Example 15.—Oxidation of methyl arabinoside

An oxidation was carried out exactly as described in Example 11 except that the solution that was oxidized contained 0.3 mole of methyl arabinoside instead of ethyl glucoside. At the end of 6 hours 27 percent of the methyl arabinoside had been converted to the corresponding uronic acid derivative.

Example 16.—Oxidation of methyl glucoside

A platinum-on-carbon catalyst was prepared as follows: Platinum (4.0 g.) as chloroplatinic acid was dissolved in 2 liters of water, 57.5 g. sodium carbonate was added and the mixture stirred until dissolved. Nuchar carbon (46.5 g.) was added and, after 10 minutes' stirring, 27.5 ml. of 36 percent formaldehyde solution was added. This mixture was stirred at 80° C. for 2 hours, cooled to room temperature and filtered. The cake was washed with increasingly dilute sodium chloride solutions (total volume about 24 liters) and finally with a liter of water. The catalyst was dried at 40–50° C. and stored in air tight bottles.

Technical grade methyl-alpha-D-glucoside (48.0 g.) was dissolved in 825 ml. water containing 25.1 g. sodium bicarbonate and 12.4 g. of the catalyst above described and containing about 10 percent of platinum was added. This suspension was stirred rapidly and maintained at 60° C. for about 24 hours while oxygen was bubbled vigorously therethrough; 46.4 percent of the methyl glucoside was found to have been converted to methyl glucuronoside.

This material was processed as described in Example 1 and 5.5 g. of glucuronolactone was isolated.

Example 17.—Oxidation of methyl glucoside

An aqueous 5.8 percent solution of methyl glucoside buffered at pH 8.8 with disodium phosphate was subjected to oxidation at 60° C. and 20 p. s. i. oxygen pressure in the presence of a platinum-on-Nuchar carbon catalyst prepared in accordance with the general method described in Example 16. The catalyst contained 3.26 percent platinum and was charged to give 2 percent platinum based on methyl glucoside. After three hours of reaction 21.4 percent of the methyl glucoside had been converted to methyl glucuronoside.

Example 18.—Oxidation of methyl glucoside

An aqueous 5.8 percent solution of methyl glucoside buffered at pH 9.0 with sodium tetraborate was subjected to oxidation at 60° C. and 15 p. s. i. oxygen pressure in the presence of a platinum-on-Nuchar carbon catalyst prepared in accordance with the general method described in Example 16. The catalyst contained 3.26 percent platinum and was added to give 2 percent platinum based on methyl glucoside. After two and one-half hours of reaction 19.4 percent of the methyl glucoside had been converted to methyl glucuronoside.

Example 19.—Oxidation of methyl glucoside

A platinum-on-silica gel catalyst (commercially available from American Platinum Works and containing 1.25 percent platinum) was added to a 5.8 percent solution of methyl glucoside containing sodium bicarbonate as buffer. The amount of catalyst added represented 2 percent platinum based on methyl glucoside. Oxygen was bubbled through the mixture while the temperature was maintained at 60° C. At the end of 8 hours 56 percent of the methyl glucoside had been converted to methyl glucuronoside.

Example 20.—Oxidation of methyl glucoside

An aqueous solution containing 58.2 g. of methyl glucoside and 30 g. of sodium bicarbonate per liter was passed through a column containing 158 g. of platinum-on-alumina catalyst (0.5 percent platinum, supplied by Baker and Company) at a liquid flow rate such that 0.505 g. of methyl glucoside was fed to the column per hour. Air was passed through the column at a rate of 48 liters per hour countercurrent to the liquid flow. The contents of the column were maintained at 70° C. During a total period of 884 hours methyl glucoside was converted to methyl glucuronoside at an average yield of 30.3 percent of theory.

Example 21.—Oxidation of methyl glucoside

An aqueous 5.8 percent solution of methyl glucoside was prepared and buffered with sodium carbonate. A sufficient amount of a commercial pelleted platinum and palladium-on-alumina catalyst was added to provide a combined weight of platinum plus palladium equal to 2 percent of the weight of the methyl glucoside. (The catalyst was obtained from Baker and Company and contained 0.3 percent platinum plus palladium on alumina.) The mixture was heated to 60° C. and agitated continuously while oxygen was bubbled through the system. In 6 hours 38 percent of the methyl glucoside was converted to methyl glucuronoside.

Example 22.—Oxidation of methyl-alpha-D-glucoside

An aqueous solution of methyl-alpha-D-glucoside was buffered with sodium carbonate and subjected to oxidation at 500 p. s. i. oxygen pressure and 120° C., in the presence of a commercial platinum-on-alumina catalyst (marketed by Baker and Company, containing 0.5% platinum) in an amount equal to 2% platinum based on the weight of methyl glucoside. In 3 hours of reaction 30 percent of the methyl glucoside was converted to methyl glucuronoside.

I claim:
1. The method of preparing derivatives of uronic acids, which comprises contacting an aqueous solution of an aldoside in which the primary alcohol group is free and in which the aldehyde function is protected by an acetal linkage with an oxidation catalyst from the group consisting of platinum, palladium, and mixtures thereof, in the presence of an oxygen containing gas, at a temperature of from about room temperature to that not exceeding the decomposition temperature of the aldoside derivative or the resulting uronic acid derivative, for a sufficient time to oxidize a substantial proportion of the primary alcohol group of the aldoside derivative, the pH of said solution being maintained within the range of about 4 to 11 during the oxidation.

2. The method of preparing uronic acids, which comprises oxidizing in aqueous solution, an aldoside in which the primary alcohol group is free and in which the aldehyde function is protected by an acetal linkage, with an oxygen containing gas, in the presence of an oxidation catalyst from the group consisting of platinum, palladium, and mixtures thereof, at a temperature of from about room temperature to a temperature not exceeding the decomposition temperature of the aldoside derivative or the resulting uronic acid derivative, hydrolyzing the resultant uronic acid derivative and removing uronic acid from the reaction mixture, the pH of said solution being maintained within the range of about 4 to 11 during the oxidation.

3. The process according to claim 1 wherein the temperature thereof is maintained within the range of 40° C. to 120° C. during the oxidation.

4. The process according to claim 2 wherein the temperature thereof is maintained within the range of 40° C. to 120° C. during the oxidation.

5. The process of preparing glucuronic acid, which comprises contacting an aqueous solution of a glucoside, with an oxidation catalyst, in the presence of an oxygen containing gas, for a sufficient time to oxidize a substantial proportion of the primary alcohol group of the glucoside, and thereafter hydrolyzing the resultant glucuronoside and recovering the glucuronic acid from the oxidation mixture; said oxidation catalyst being selected from the group consisting of platinum, palladium and mixture thereof; the temperature during the oxidation reaction being from about room temperature to a temperature not exceeding the decomposition temperature of the glucoside or glucuronoside; the pH of said aqueous solution being maintained within the range of about 4 to 11 during the oxidation.

6. The process of preparing glucuronic acid, which comprises contacting an aqueous solution of 1,2-isopropylidene glucose with an oxidation catalyst in the presence of oxygen containing gas for a sufficient time to oxidize a substantial proportion of the primary alcohol group of the 1,2-isopropylidene glucose and thereafter hydrolyzing the resultant isopropylidene glucuronic acid and recovering the glucuronic acid; said oxidation catalyst being selected from the group consisting of platinum, palladium and mixtures thereof; the pH of said solution being maintained at about 4 to 11 during the oxidation; the temperature during the oxidation reaction being from about room temperature to a temperature not exceeding the decomposition temperature of the 1,2-isopropylidene glucose or the oxidation product thereof.

7. The method of preparing glucuronic acid from methyl glucoside, which comprises oxidizing methyl glucoside in an aqueous medium by means of an oxygen containing gas in the presence of a catalyst from the group consisting of platinum, palladium, and mixtures thereof, and recovering glucuronic acid; the pH of said aqueous medium being maintained within the range of about 4 to 11 during the oxidation.

8. The method of preparing uronosides, which comprises oxidizing glycosides in an aqueous medium by means of an oxygen containing gas in the presence of a catalyst from the group consisting of platinum, palladium, and mixtures thereof, and recovering the uronoside; the pH of said aqueous medium being maintained within the range of about 4 to 11 during the oxidation.

9. The method of preparing uronosides, which comprises oxidizing glycosides in an aqueous medium by means of an oxygen containing gas in the presence of a catalyst from the group consisting of platinum, palladium, and mixtures thereof, and recovering the uronoside by adsorbing it on an acid adsorbent resin; the pH of said aqueous medium being maintained within the range of about 4 to 11 during the oxidation.

10. In the process of preparing uronic acids by oxidizing aldosides in which the primary alcohol group is free and in which the aldehyde function is protected by an acetal linkage in the presence of a catalyst from the group consisting of platinum, palladium and mixtures thereof, the improvement which comprises recovering the uronic acid derivative resulting from said oxidation by adsorbing said derivative on an acid adsorbent resin and thereafter separating said derivative from said resin.

11. The method of preparing glucuronic acid from ethyl glucoside, which comprises oxidizing ethyl glucoside in an aqueous medium by means of an oxygen containing gas in the presence of a catalyst from the group consisting of platinum, palladium and mixtures thereof, and recovering glucuronic acid; the pH of said aqueous medium being maintained within the range of about 4 to 11 during the oxidation.

12. The method of preparing glucuronic acid from sucrose, which comprises oxidizing sucrose in an aqueous medium by means of an oxygen containing gas in the presence of a catalyst from the group consisting of platinum, palladium and mixtures thereof, and recovering glucuronic acid; the pH of said aqueous medium being maintained within the range of about 4 to 11 during the oxidation.

13. The method of preparing uronic acids, which comprises oxidizing in aqueous solution, an aldoside in which the primary alcohol group is free and in which the aldehyde function is protected by an acetal linkage, with an oxygen containing gas, in the presence of an oxidation catalyst from the group consisting of platinum, palladium, and mixtures thereof; the pH of said solution being maintained within the range of about 4 to 11 during the oxidation; at a temperature of from about room temperature to a temperature not exceeding the decomposition temperature of the aldoside derivative or the resulting uronic acid derivative, adsorbing said uronic acid derivative by passing the liquor over an acid adsorbent resin and subjecting the effluent from the acid adsorbent resin, containing unoxidized aldoside derivative, to further oxidation in the presence of said catalyst, and recovering uronic acid.

14. Process according to claim 1 wherein sodium carbonate is employed to maintain the pH within said range of 4 to 11.

15. Process according to claim 1 wherein sodium bicarbonate is employed to maintain the pH within said range of 4 to 11.

16. Process according to claim 1 wherein sodium hydroxide is employed to maintain the pH within said range of 4 to 11.

17. Process according to claim 2 wherein sodium carbonate is employed to maintain the pH within said range of 4 to 11.

18. Process according to claim 2 wherein sodium bicarbonate is employed to maintain the pH within said range of 4 to 11.

19. Process according to claim 2 wherein sodium hydroxide is employed to maintain the pH within said range of 4 to 11.

20. A method for the preparation of 1,2-isopropylidene glucuronic acid comprising oxidizing an aqueous solution of 1,2-isopropylidene glucose by means of an oxygen containing gas in the presence of a catalyst selected from the group consisting of platinum and palladium, the pH of said aqueous solution being maintained within the range of 4 and above throughout the reaction.

21. The process comprising oxidizing an aqueous solution of 1-lower alkyl-D-glucoside in which the primary alcohol group is free, by means of an oxygen-containing gas, in the presence of a platinum catalyst, the pH of the aqueous solution being maintained within the range of 4 and above throughout the reaction, and hydrolyzing the resulting 1-lower alkyl-D-glucuronic acid with acid to D-glucuronic acid.

22. The process comprising oxidizing an aqueous solution of alpha-methyl-D-glucoside by means of an oxygen containing gas, in the presence of a platinum catalyst, the pH of the aqueous solution being maintained within the range of 4 and above throughout the reaction, and hydrolyzing the resulting 1-methoxy-D-glucuronic acid with acid to D-glucuronic acid.

References Cited in the file of this patent

UNITED STATES PATENTS

| | | |
|---|---|---|
| 2,190,377 | Dalmer | Feb. 13, 1940 |
| 2,301,811 | Reichstein | Nov. 10, 1942 |

OTHER REFERENCES

"Advances in Carbohydrate Chemistry," vol. 3, Academic Press (1948), pages 131 and 164.

Pigman: "Carbohydrate Chemistry," Academic Press, 1948, pp. 304, 305, 338.

Glattfeld: J. Amer. Chem. Soc., September 1938, vol. 60, pages 2013–2023.

Zervas: Berichte der deut. Chem. Gess. 6613. Pages 1326–1329 (1933).